(12) United States Patent
Kuno et al.

(10) Patent No.: US 8,952,601 B2
(45) Date of Patent: Feb. 10, 2015

(54) SPARK PLUG

(75) Inventors: Takehito Kuno, Nagoya (JP); Osamu Yoshimoto, Inazawa (JP); Tomoo Tanaka, Kitanagoya (JP)

(73) Assignee: NGK Spark Plug Co., Ltd., Aichi (JP)

( * ) Notice: Subject to any disclaimer, the term of this patent is extended or adjusted under 35 U.S.C. 154(b) by 40 days.

(21) Appl. No.: 13/994,778

(22) PCT Filed: Dec. 22, 2011

(86) PCT No.: PCT/JP2011/007207
§ 371 (c)(1),
(2), (4) Date: Jun. 17, 2013

(87) PCT Pub. No.: WO2012/086206
PCT Pub. Date: Jun. 28, 2012

(65) Prior Publication Data
US 2013/0293088 A1   Nov. 7, 2013

(30) Foreign Application Priority Data
Dec. 24, 2010   (JP) ................................. 2010-287072

(51) Int. Cl.
*H01T 13/02* (2006.01)
*C22C 19/03* (2006.01)
(Continued)

(52) U.S. Cl.
CPC ............... *H01T 13/02* (2013.01); *C22C 19/03* (2013.01); *H01T 13/32* (2013.01); *H01T 21/02* (2013.01); *C22C 19/005* (2013.01); *C22C 19/007* (2013.01); *H01T 13/39* (2013.01)
USPC ....................................... 313/141

(58) Field of Classification Search
USPC .................................................. 313/141–145
See application file for complete search history.

(56) References Cited

U.S. PATENT DOCUMENTS

| 7,586,246 B2 | 9/2009 | Okamoto ....................... 313/141 |
| 7,823,556 B2 | 11/2010 | Lykowski et al. ....... 123/169 EL |

(Continued)

FOREIGN PATENT DOCUMENTS

| JP | 5-013148 | 1/1993 | .............. H01T 13/20 |
| JP | 10-251786 | 9/1998 | .............. C22C 19/05 |

(Continued)

OTHER PUBLICATIONS

Form PCT/ISA/210—Int'l Search Report (from corresponding Int'l Patent App. No. PCT/JP2011/007207—1 page.

(Continued)

*Primary Examiner* — Britt D Hanley
*Assistant Examiner* — Brenitra M Lee
(74) *Attorney, Agent, or Firm* — Kusner & Jaffe

(57) ABSTRACT

It is an object of the present invention to provide a spark plug having a ground electrode joined securely by electric resistance welding. The spark plug includes a cylindrical metal shell and a ground electrode joined by electric resistance welding to an end portion of the metal shell. The metal shell has a high hardness region formed with a Vickers hardness of $3 \times 10^2$ to $5 \times 10^2$ Hv in the end portion thereof in such a manner that the high hardness region, when viewed in cross section along a plane including an axis of the spark plug and an axis of the ground electrode, has a length d of 0.3 to 0.8 mm from a ground electrode side welding boundary to a metal shell side welding boundary in a direction of load applied during the electric resistance welding.

11 Claims, 3 Drawing Sheets

(51) Int. Cl.
*H01T 13/32* (2006.01)
*H01T 21/02* (2006.01)
*C22C 19/00* (2006.01)
*H01T 13/39* (2006.01)

(56) References Cited

U.S. PATENT DOCUMENTS

| | | | |
|---|---|---|---|
| 8,207,657 B2 | 6/2012 | Suzuki et al. | 313/141 |
| 2005/0179353 A1 | 8/2005 | Watanabe | 313/141 |
| 2007/0290591 A1 | 12/2007 | Lykowski et al. | 313/141 |
| 2011/0012499 A1* | 1/2011 | Suzuki et al. | 313/141 |
| 2011/0043093 A1* | 2/2011 | Nunome | 313/141 |

FOREIGN PATENT DOCUMENTS

| | | | |
|---|---|---|---|
| JP | 2003-229231 | 8/2003 | H01T 21/02 |
| JP | 2004-206931 | 7/2004 | H01T 13/20 |
| JP | 2005-228562 | 8/2005 | H01T 13/20 |
| JP | 2005-251727 | 9/2005 | H01T 13/20 |
| JP | 2010-108939 | 5/2010 | H01T 13/20 |
| KR | 2009-0033229 A | 4/2009 | |
| WO | WO 2010/053099 | 11/2009 | H01T 13/32 |

OTHER PUBLICATIONS

Office Action received in corresponding Korean Patent Application No. 10-2013-7019557.

* cited by examiner

SPARK PLUG

FIELD OF THE INVENTION

The present invention relates to a spark plug and, more particularly, to a spark plug for an internal combustion engine in which a ground electrode is joined to an end portion of a metal shell by resistance welding with high welding strength.

BACKGROUND OF THE INVENTION

A spark plug for an internal combustion engine such as automotive engine includes a center electrode arranged in a combustion chamber of the internal combustion engine and a ground electrode facing the center electrode with a spark discharge gap left therebetween so as to generate a spark discharge in the spark discharge gap inside the combustion chamber of the internal combustion engine for ignition of fuel fed into the combustion chamber. The respective electrodes of the spark plug are made of high heat resistant material such as Ni-based alloy as each of these spark plug electrodes is placed in the combustion chamber of which the atmosphere reaches a high temperature.

In this spark plug, the ground electrode is generally joined by electric resistance welding to an end portion of a metal shell. However, the ground electrode may not be resistance welded to the metal shell with sufficient welding strength so that breakage or damage occurs in the welding joint between the ground electrode and the metal shell during adjustment of the spark discharge gap, after manufacturing of the spark plug or during use of the spark plug. For example, it is mentioned in paragraph 0046 of Japanese Laid-Open Patent Publication No. 2003-229231 as follows: "If the Vickers hardness of the ground electrode is 220 Hv or higher, the ground electrode is so poor in bending workability that separation or breakage occurs from the welding interface during bending. In this way, the ground electrode of high hardness cannot be properly joined to the housing by the conventional joining method due to the difficulty for the ground electrode to secure both of breakage resistance and bending workability."

There have thus been made several proposals about the welding state and welding method of the metal shell and the ground electrode. For example, one proposal discloses a method of joining a ground electrode to a housing after subjecting the ground electrode to bending (see Japanese Laid-Open Patent Publication No. 2003-229231). Another proposal discloses a spark plug in which a ground electrode is embedded at an end thereof in a housing so as to increase welding area for improvement in welding strength (see Japanese Laid-Open Patent Publication No. 2005-251727). Still another proposal discloses a spark plug in which the dimensions of a metal shell or the setting angle of a ground electrode is controlled so as to secure welding strength (see Japanese Laid-Open Patent Publication No. 2005-228562).

As the spark plug generates a spark discharge in the spark discharge gap, the respective electrodes of the spark plug require not only heat resistance but also spark wear resistance. For example, a Ni-based alloy with a high Ni content is known as material for improvement in spark wear resistance. The ground electrode of such a Ni-based alloy is high in spark wear resistance, but is more difficult to weld than that of a Ni-based alloy with a not-so-high Ni content. It is thus necessary to take any measure, such as supplying a large electric current to the ground electrode and the metal shell, for electric resistance welding of the ground electrode and the metal shell. Even by taking the above measure, the ground electrode may not be joined to the metal shell by electric resistance welding with sufficient welding strength.

It is accordingly an object of the present invention to provide a spark plug having a ground electrode joined securely by electric resistance welding.

SUMMARY OF THE INVENTION

The present inventors have made extensive researches on the welding states between Ni-based alloys with a wide range of Ni content and metal shells and have found that a high hardness region appears in the metal shell at a position adjacent to the ground electrode under the action of heat generated during electric resistance welding and becomes a cause of low welding strength. The present inventors have assumed the reason for this would be the occurrence of thermal residual stress in the high hardness region by increase of hardness and/or residual stress e.g. residual tensile stress in the welding interface between the ground electrode and the metal shell due to volume expansion by increase of hardness during the electric resistance welding. The present inventors have further assumed that: dissolved hydrogen in the metal material comes together to residual stress distortion and causes embrittlement of the high hardness region; and there also occurs residual stress in the interface of the high hardness region and the region where the hardness remains unchanged during the electric resistance welding.

The present inventors have assumed that, even though the high hardness region inevitably appears in the metal shell by the supply of a large electric current to the ground electrode and the metal shell during electric resistance welding, the ground electrode and the metal shell can be resistance welded together with sufficient welding strength by limiting the high hardness region to a small size.

The present inventors have then found, as a result of further researches made on the high hardness region based on the above findings and assumptions, that it is possible to achieve high welding strength between the ground electrode and the metal shell in the spark plug by forming a high hardness region in the metal shell in such a manner that the high hardness region falls within a predetermined length range in the direction of load applied during the electric resistance welding, even when the ground electrode is of conventional Ni-based alloy or Ni-based alloy with high Ni content. In particular, the present inventors have noticed that it is possible to achieve high welding strength between the ground electrode and the metal shell when the high hardness region is formed with a Vickers hardness of $3 \times 10^2$ to $5 \times 10^2$ Hv in such a manner that the length of the high hardness region is in the range of 0.3 to 0.8 mm.

Accordingly, the following spark plug is provided as means for solving the above problems.

Configuration (1) In accordance with the present invention, there is provided a spark plug comprising: a cylindrical metal shell; and a ground electrode joined to an end portion of the metal shell by electric resistance welding, wherein the metal shell has a high hardness region formed with a Vickers hardness of $3 \times 10^2$ to $5 \times 10^2$ Hv in the end portion thereof in such a manner that the high hardness region, when viewed in cross section along a plane including an axis of the spark plug and an axis of the ground electrode, has a length d of 0.3 to 0.8 mm from a ground electrode-side welding boundary to a metal shell-side welding boundary in a direction of load applied during the electric resistance welding.

The following are preferred configurations of the spark plug according to the present invention.

Configuration (2) In accordance with the present invention, there is provided a spark plug according to the above configuration (1), wherein the length d is in a range of 0.4 to 0.6 mm.

Configuration (3) In accordance with the present invention, there is provided a spark plug according to the above configurations (1) or (2), wherein the high hardness region contains at least an acicular martensite structure.

Configuration (4) In accordance with the present invention, there is provided a spark plug according to any one of the above configurations (1) to (3), wherein the ground electrode has either a simple structure formed of one kind of electrode material or a layer structure including an outer layer formed of the electrode material and an inner layer arranged in the outer layer and having a higher thermal conductivity than the outer layer.

Configuration (5) In accordance with the present invention, there is provided a spark plug according to any one of the above configurations (1) to (4), wherein the electrode material has a specific resistance of 7 to 20 µΩ·cm at room temperature.

Configuration (6) In accordance with the present invention, there is provided a spark plug according to any one of the above configurations (1) to (5), wherein the electrode material has a specific resistance of 48 to 60 µΩ·cm at 1000° C.

Configuration (7) In accordance with the present invention, there is provided a spark plug according to any one of the above configurations (1) to (6), wherein the electrode material contains 96 mass % or more of Ni, 0.05 to 0.45 mass % in total of at least one selected from the group consisting of Y and rare earth elements, 0.05 mass % or more of Mn and 0.1 mass % or more in total of at least one selected from the group consisting of Ti, V and Nb; and wherein the ratio (a/b) of the total content (a) of Ti, V and Nb to the content (b) of Mn ranges from 0.02 to 0.40.

Configuration (8) In accordance with the present invention, there is provided a spark plug according to any one of the above configurations (1) to (7), wherein the electrode material contains an intermetallic compound of Ni and at least one of Y and rare earth elements.

It is possible according to the present invention to join the ground electrode securely to the metal shell by electrical resistance welding in the spark plug as the high hardness region is formed with a Vickers hardness of $3 \times 10^2$ to $5 \times 10^2$ Hv in the end portion of the metal shell in such a manner that the high hardness region, when viewed in cross section along the plane including the axis of the spark plug and the axis of the ground electrode, has a length d of 0.3 to 0.8 mm, preferably 0.4 to 0.6 mm, from the ground electrode-side welding boundary to the metal shell-side welding boundary in the direction of load applied during the electric resistance welding.

It is possible according to the present invention to achieve higher welding strength between the ground electrode and the metal shell so that the spark plug can be used with less trouble when the high hardness region contains an acicular martensite structure.

It is also possible according to the present invention to achieve higher welding strength between the ground electrode and the metal shell and thereby form the welding joint with high strength in the spark plug when the electrode material of the ground electrode has a specific resistance of 7 to 20 µΩ·cm at room temperature. If the specific resistance of the electrode material is too low, the electric resistance welding is difficult to perform so that the welding strength between the ground electrode and the metal shell may be lowered. If the specific resistance of the electrode material is too high, the high hardness region becomes so large that the welding strength between the ground electrode and the metal shell may be lowered.

It is further possible according to the present invention to stabilize the welding quality, with less consumption of the ground electrode during the electric resistance welding, and achieve high welding strength between the ground electrode and the metal shell in the spark plug when the electrode material of the ground electrode has a specific resistance of 48 to 60 µΩ·cm at 1000° C.

In the present invention, the ground electrode can adopt a simple structure formed of one kind of electrode material such as Ni-based alloy or a layer structure including an outer layer formed of the electrode material such as Ni-based alloy and an inner layer arranged in the outer layer and having a higher thermal conductivity, i.e., a lower specific resistance than the outer layer. The layer structure is not limited to a two-layer structure. The ground electrode may have a layer structure of three layers or four or more layers including at least one layer or core arranged in the inner layer and formed of different material from the inner layer.

Further, the ground electrode and the metal shell are joined by electric resistance welding in the present invention. In this electric resistance welding, a chuck is disposed on an outer circumference of the ground electrode and used as an electrode lead so that an electric current mainly flows through an outer circumferential portion of the ground electrode. It is preferable to use Cu, Cu alloy or pure Ni as material of the inner layer (sometimes referred to as "core material") such that the inner layer has a higher thermal conductivity than the outer layer so as to allow instant radiation of heat generated due to contact resistance as welding (joining) driving force. Namely, the core material has no contribution to the welding force. The welding strength is thus influenced by the properties of the outer layer, which is lower in thermal conductivity than the inner layer, in the case where the core material is arranged inside the ground electrode. The specific resistance of the outer layer of the ground electrode at room temperature and the specific resistance of the outer layer of the ground electrode at 1000° C. are known as such properties of the outer layer. When the specific resistance of the outer layer of the ground electrode is in the range of 7 to 20 µΩ·cm at room temperature and when the specific resistance of the outer layer of the ground electrode is in the range of 48 to 60 µΩ·cm at 1000° C., it is possible to stabilize the welding quality, with less consumption of the ground electrode during the electric resistance welding, and achieve high welding strength between the ground electrode and the metal shell in the spark plug.

It is possible according to the present invention to easily adjust the length d of the high hardness region to 0.3 to 0.8 mm and achieve high welding strength in the spark plug when the electrode material of the ground electrode contains 96 mass % or more of Ni, 0.05 to 0.45 mass % in total of at least one selected from the group consisting of Y and rare earth elements, 0.05 mass % or more of Mn and 0.01 mass % or more in total of at least one selected from the group consisting of Ti, V and Nb and when the ratio (a/b) of the total content (a) of Ti, V and Nb to the content (b) of Mn ranges from 0.02 to 0.40.

Furthermore, there occurs deposition of a sufficient amount of intermetallic compound wherein the electrode material of the ground electrode contains Ni and at least one of Y and rare earth elements. It is possible by the formation of such an intermetallic compound to limit grain growth and obtain further improvement in the strength of the ground electrode and, by extension, in the welding strength between the ground electrode and the metal shell.

The spark plug according to the present invention is therefore able to limit deterioration of the welding joint between the ground electrode and the metal shell even under high-temperature conditions and secure high welding strength between the ground electrode and the metal shell.

DETAILED DESCRIPTION OF PREFERRED EMBODIMENTS

A spark plug according to the present invention includes a cylindrical metal shell and a ground electrode joined to an end portion of the metal shell by electric resistance welding. As long as the spark plug according to the present invention has the above configuration, the other configurations of the spark plug according to the present invention are not particularly limited. The spark plug according to the present invention can adopt various known configurations.

Figure 1A:
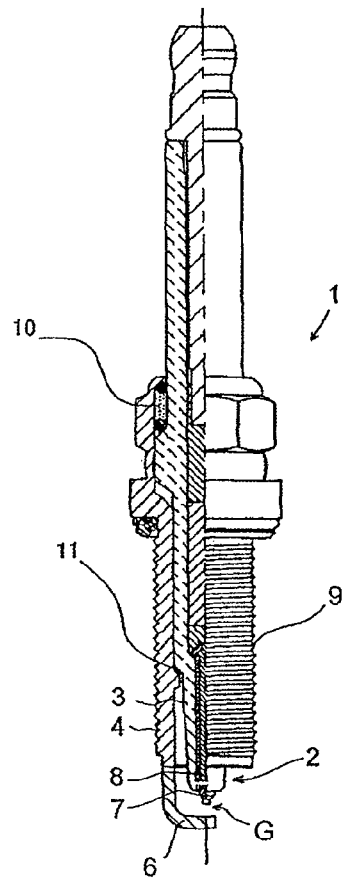
FIG. 1(a) is a schematic view of a spark plug according to one embodiment of the present invention, showing the spark plug partly in section.
Figure 1B:
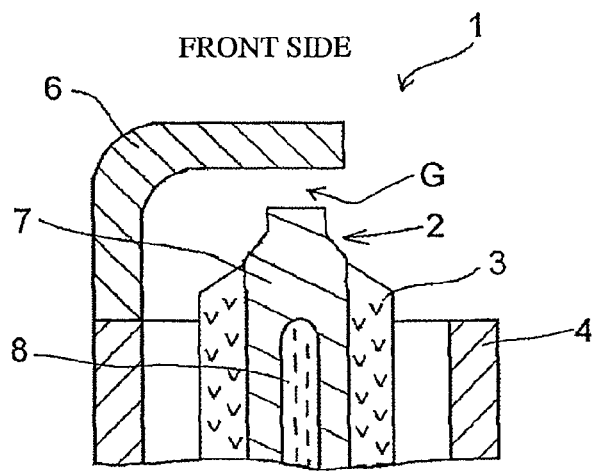
FIG. 1(b) is a cross-section view of substantive part of the spark plug according to the one embodiment of the present invention.
Figure 2:
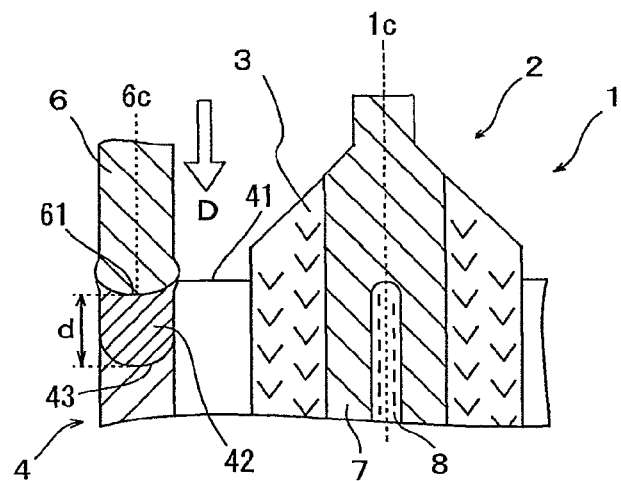
FIG. 2 is an enlarged cross-view of part of the spark plug, when taken along a plane including an axis of the spark plug and an axis of a ground electrode, according to the one embodiment of the present invention.

FIGS. 1(a), 1(b) and 2 schematically show a spark plug 1 as one embodiment of the present invention. As shown in FIGS. 1(a), 1(b) and 2, the spark plug 1 includes a substantially rod-shaped center electrode 2, a substantially cylindrical insulator 3 disposed around an outer circumference of the center electrode 2, a cylindrical metal shell 4 retaining therein the insulator 3 and a ground electrode 6 having a distal end facing a front end face of the center electrode 2 with a spark discharge gap G left therebetween and a base end joined to an end portion of the metal shell 4. It is herein noted that, for the sake of convenience, one end side of the spark plug 1 on which the ground electrode 6 is arranged in the metal shell 4 (e.g. the bottom side in FIG. 1(a)) is referred to as a front side and the other end side of the spark plug 1 (e.g. the top side in FIG. 1(a)) is referred to as a rear side.

As shown in FIGS. 1(a) and 1(b), the metal shell 4 is cylindrical in shape and is adapted to receive and retain therein the insulator 3. A thread portion 9 is formed on an outer circumferential surface of a front part of the metal shell 4 such that the spark plug 1 is mounted to a cylinder head of an internal combustion engine (not shown) by means of the thread portion 9. The metal shell 4 can be made of conductive steel material e.g. low-carbon steel.

The insulator 3 is retained by an inner circumferential portion of the metal shell 4 via a talc (talcous material) 10 and a packing 11 as shown in FIGS. 1(a), 1(b) and 2. An axial hole is formed in the insulator 3 along an axis direction thereof such that the center electrode 2 is retained in the axial hole. The insulator 3 is fixed to the metal shell 4 with a front end portion thereof protruding from a front end face of the metal shell 4. The insulator 3 can be made of material through which heat is difficult to transfer. Examples of such material are sintered ceramic materials mainly made of alumina.

As shown in FIGS. 1(a), 1(b) and 2, the center electrode 2 has an outer member 7 and an inner member 8 coaxially embedded in an axial portion of the outer member 7. The center electrode 2 is fixed in the axial hole of the insulator 3, with a front end portion thereof protruding from a front end opening of the insulator 3, and is kept insulated from the metal shell 4. The front end portion of the center electrode 2 is shaped to gradually decrease in diameter from the front end opening of the insulator 3 like a frustum of a cone, and then, to extend in cylindrical form as shown in FIGS. 1(a) and 2. The center electrode 2 can be made of know material or the same electrode material as the ground electrode 6. In the case where the center electrode 2 is of known material, for example, the outer member 7 can be made of known Ni alloy etc. and the inner member 8 can be made of high heat conductive metal material such as copper (Cu) or silver (Ag).

The ground electrode 6 is bent at a middle portion thereof and thereby formed into a substantially L-like prism shape. The form and structure of the ground electrode 6 are so designed that: the base end of the ground electrode 6 is joined by electric resistance welding to the front end face 41 of the metal shell 4; and the distal end of the ground electrode 6 is located on an axis direction of the center electrode 2 as shown in FIGS. 1(a), 1(b) and 2. By such a design, the ground electrode 6 is arranged such that the distal end of the ground electrode 6 faces the center electrode 2 via the spark discharge gap G. The spark discharge gap G is defined as a gap between the front end face of the center electrode 2 and the surface of the ground electrode 6 and is in general adjusted to 0.3 to 1.5 mm.

Figure 5:
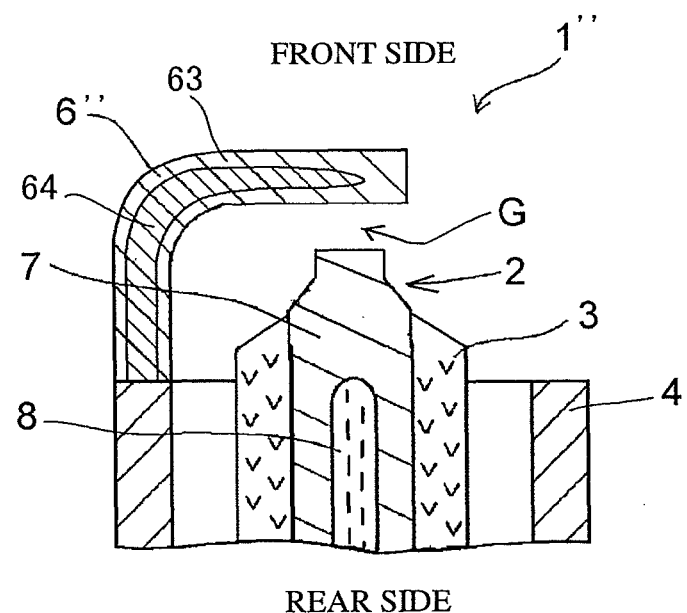
FIG. 5 is an enlarged cross-view of part of a spark plug, when taken along a plane including an axis of the spark plug and an axis of a ground electrode, according to still another embodiment of the present invention.

Herein, the ground electrode 6 has a simple structure formed of one kind of electrode material in FIGS. 1(a), 1(b) and 2. The ground electrode 6 may alternatively adopt a two-layer structure including an outer layer 63 and an inner layer 64 arranged in the outer layer 63 and having a higher thermal conductivity than the outer layer 63 as shown in FIG. 5. Further, the ground electrode 63 may alternatively be formed with a three-layer structure by arranging a core in the inner layer or be formed with a multilayer structure of four or more layers although not shown in the drawings. The outer layer 63 can be made of any known material, but is preferably made of the after-mentioned ground electrode material in view of the fact that the welding strength is influenced by the properties of the outer layer 63. The inner layer 64 can be made of any material higher in thermal conductivity than the material of the outer layer 63, such as preferably Cu or Cu alloy. In the case of the three-layer ground electrode, the core inside the inner layer can preferably be made of pure Ni. In FIG. 5, the inner layer 64 extends from a base end to the vicinity of a distal end of the ground electrode 6" and has a diameter gradually decreasing toward the distal end of the ground electrode 6". The region of arrangement of the inner layer 64 can however be set as appropriate depending on the performance required of the ground electrode.

As shown in FIG. 2, a high hardness region 42 is formed in the end portion of the metal shell 4 to which the ground electrode 6 has been joined by electric resistance welding. This high hardness region 42 has its hardness increased due to solid phase transformation of the material of the metal shell 4 under the action of heat generated by the flow of an electric current through the ground electrode 6 and the metal shell 4 during the electric resistance welding. The high hardness region 42 is thus generally formed adjacent to the welding joint between the ground electrode 6 and the metal shell 4 during the electric resistance welding.

Figure 4:
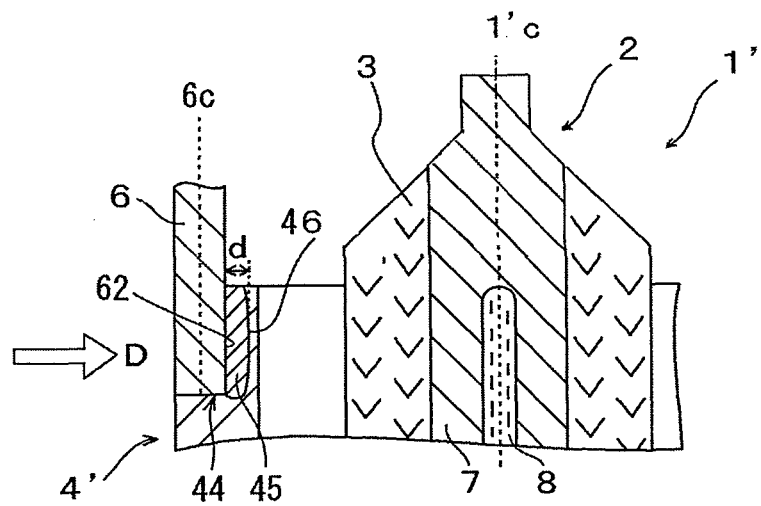
FIG. 4 is an enlarged cross-view of part of the spark plug, when taken along a plane including an axis of the spark plug and an axis of a ground electrode, according to the another embodiment of the present invention.

In this spark plug 1, the ground electrode 6 is joined to the end face 41 of the metal shell 4 by electric resistance welding with the application of load in an axis direction of the metal shell 4. As a result, the high hardness region 42 is formed so as to extend in the direction of diffusion of heat generated during the electric resistance welding, e.g., in the axis direction of the metal shell 4 as shown in FIG. 2. Although the ground electrode 6 is resistance welded to the end face of the metal shell 4 in FIG. 2, the ground electrode may alternatively be joined by resistance welding to an outer circumferential surface of the end portion of the metal shell as shown in FIG. 4. In this case, it is feasible to join the ground electrode 6 to the outer circumferential surface of the end portion of the metal shell by inserting the ground electrode into an insertion slit, which has been formed in parallel with an axis of the metal shell so as to be open at the outer circumferential surface and end face of the end portion of the metal shell, and then, performing electric resistance welding on the ground electrode while applying load to the ground electrode in a direction perpendicular to the axis of the metal shell.

Regardless of whether the ground electrode is joined to the end face of the metal shell or the outer circumferential surface of the end portion of the metal shell, the high hardness region is defined as a region surrounded by a welding interface between the metal shell and the ground electrode, i.e., a welding boundary on the side of the ground electrode and by an interface between the high hardness region and the region where the hardness remains unchanged by electric resistance welding, i.e., a welding boundary inside the metal shell.

In FIG. 2, the high hardness region 42 is defined by a welding boundary 61 on the side of the ground electrode 6 and a welding boundary 43 on the side of the metal shell 4 when viewed in cross section along a plane including an axis 1c of the spark plug 1 and an axis 6c of the ground electrode 6.

These welding boundaries 61 and 43 can be identified by taking a cross section through the welding joint between the ground electrode 6 and the metal shell 4, etching the cross section of the welding joint and observing the cross section of the welding joint with a metallurgical microscope.

The high hardness region 42 has a Vickers hardness of $3 \times 10^2$ to $5 \times 10^2$ Hv. Herein, the Vickers hardness refers to a value measured by pressing a regular pyramidal indenter of opposite face angle $\alpha=136°$ to a test sample with the application of a load of 490 mN according to a micro-Vickers hardness test method as defined in JIS Z 2244.

Further, the high hardness region 42 has a length d of 0.3 to 0.8 mm from the welding boundary 61 on the side of the ground electrode 6 to the welding boundary 43 on the side of the metal shell 4 in the direction D of load applied during the electric resistance welding, when viewed in cross section along the plane including the axis 1c of the spark plug 1 and the axis 6c of the ground electrode 6, as shown in FIG. 2. In other words, the high hardness region 42, when viewed in cross section along the plane including the axis 1c of the spark plug 1 and the axis 6c of the ground electrode 6, extends in the end portion of the metal shell 4 over a length d of 0.3 to 0.8 mm from the welding boundary 61 on the side of the ground electrode 6 to the welding boundary 43 on the side of the metal shell 4 in the direction D of load applied during the electric resistance welding. If the length d is less than 0.3 mm, the ground electrode 6 may not be joined by electric resistance welding to the metal shell 4. If the length d exceeds 0.8 mm, the ground electrode 6 can be joined by electric resistance welding to the metal shell 4 but with low welding strength. In order to achieve higher welding strength between the ground electrode 6 and the metal shell 4, the length d of the high hardness region 42 is preferably 0.35 to 0.65 mm, more preferably 0.4 to 0.6 mm, still more preferably 0.45 to 0.55 mm. Herein, the length d refers to a maximum length of the high hardness region 42 in the direction D of load applied during the electric resistance welding. In the spark plug 1, the length d is a length of the high hardness region 32 along an extension of the axis 6c (in agreement with the direction D of load applied during the electric resistance welding).

The length d can be measured by e.g. the following procedure. The spark plug 1 is first cut along the plane including the axis 1c of the spark plug 1 and the axis 6c of the ground electrode 6. The resulting cross section is etched and then observed with a metallurgical microscope. In the thus-obtained cross-sectional microscopic photograph, the direction D of load applied during the electric resistance welding is identified. Subsequently, the length from the welding boundary 61 on the side of the ground electrode 6 to the welding boundary 43 on the side of the metal shell 4 along the axis of the ground electrode in the cross-sectional microscopic photograph is determined as the length d.

Preferably, the high hardness region 42 contains an acicular martensite structure. Even in the presence of the martensite structure in the high hardness region, the welding strength of the welding joint between the ground electrode and the metal shell may be lowered if the length d of the high hardness region exceeds 0.8 mm. The welding strength of the welding joint between the ground electrode and the metal shell may also be lowered if the length d of the high hardness region is less than 0.3 mm even in the presence of the martensite structure in the high hardness region. It is possible to further improve the welding strength when the length d of the high hardness region is in the range of 0.3 to 0.8 mm, preferably 0.4 to 0.6 mm, and when the martensite structure is present in the high hardness region.

Although the martensite structure can be in acicular form, spherical form etc., it is preferable that the martensite structure is in acicular form for higher welding strength. The presence or absence of the acicular martensite structure in the high hardness region 42 can be confirmed by etching the cross section of the high hardness region 42 and observing the cross section of the high hardness region 42 with a metallurgical microscope.

There is no particular limitation on the dimensions of the ground electrode 6 as long as the ground electrode 6 has dimensions capable of adapting with the nominal diameter required for the spark plug and being resistance welded to the metal shell 4.

The ground electrode 6 is resistance welded to the end portion of the metal shell 4 by passing an electric current through the ground electrode 6 and the metal shell 4 in the state of pressing the metal shell 4 against the end portion of the ground electrode 6, i.e., the load-applied state. Under the manufacturing conditions in the manufacturing method of the spark plug according to the present invention, the electrode material of the simple-structured ground electrode or the electrode material of the outer layer of the layer-structured ground electrode preferably has a specific resistance of 7 to 20 $\mu\Omega \cdot cm$, more preferably 8 to 17 $\mu\Omega \cdot cm$, at room temperature.

In the case where the high hardness region extends over a length d of 0.3 to 0.8 mm at the weld joint between the ground electrode and the metal shell, it is possible to form the welding joint with high welding strength when the specific resistance of the electrode material at room temperature is in the above range.

In order to control the high hardness region to within the specific size for improvement in welding strength according to the present invention, i.e., control the length d from the ground electrode-side welding boundary to the metal shell-side welding boundary to within the range of 0.3 to 0.8 mm, the material of the ground electrode preferably has a specific resistance of 48 to 60 μΩ·cm, preferably 49 to 54 μΩ·cm, at 1000° C.

It is particularly preferable that the electrode material has not only a specific resistance of 7 to 20 μΩ·cm at room temperature but also a specific resistance of 48 to 60 μΩ·cm at 1000° C.

The specific resistance of the electrode material at room temperature or the specific resistance of the electrode material at 1000° C. can be determined by a Wheatstone bridge method while heating and maintaining the ground electrode at room temperature or 1000° C. In the case where the ground electrode has the outer and inner layers, the specific resistance of the outer layer, excluding the inner layer, can be determined at room temperature or 1000° C. in the above-mentioned manner.

The electrode material of the ground electrode can be Ni solely. In this case, it is needless to say that the ground electrode may contain a trace amount of unavoidable impurity(s).

The electrode material of the ground electrode can be an electrode material containing 96 mass % or more of Ni. In this case, it is preferable that the electrode material further contains: 0.05 to 0.45 mass % in total of at least one selected from the group consisting of Y and rare earth elements; 0.05 mass % or more, more preferably 0.05 to 3 mass %, of Mn: and 0.01 mass or more in total, more preferably 0.01 to 0.1 mass %, of at least one selected from the group consisting of Ti, V and Nb and that the ratio (a/b) of the total content (a) of Ti, V and Nb to the content (b) of Mn in the electrode material is 0.02 to 0.40 for improvements in the welding strength between the ground electrode and the metal shell as well as the oxidation resistance of the ground electrode. Examples of the rare earth elements are Nd, La, Ce, Pr, Nd, Pm, Sm, Eu, Gd, Tb, Dy, Ho, Er, Tm, Yb and Lu.

In the present invention, the electrode material may optionally contain at least one metal component selected from the group consisting of Si, Al and Cr in addition to the above components. The content of these metal components is determined by subtracting the sum of the content of Ni, the content of at least one of Y and rare earth elements, the content of Mn and the content of at least one of Ti, V and Nb from 100 mass %. Preferably, the content of Si is in a range of 0.15 to 1.5 mass %; the content of Al is in a range of 0.01 to 0.1 mass %; and the content of Cr is in a range of 0.05 to 0.5 mass % provided that the total content of the material components is 100 mass %.

When at least one of Si, Al and Cr is contained in the electrode material, the oxidation film of Mn is more strengthened. It is thus possible to obtain improvement in oxidation resistance and prevent the occurrence of corrosion-like generated foreign substances more effectively by the addition of at least one of Si, Al and Cr to the electrode material.

The electrode material may further optionally contain C. When C is contained in the electrode material, the electrode material can secure mechanical strength under high-temperature conditions so as to prevent breakage or deformation of the ground electrode. The content of C is preferably in a range of 0.005 mass % or more, more preferably 0.01 to 0.05 mass % in order for the ground electrode to secure mechanical strength even if the electrode temperature rises due to poor heat radiation.

In the case where the electrode material contains Y and the rare earth element(s), the total content of Y and the rare earth element(s) is 0.05 to 0.45 mass % based on the total mass of the ground electrode. When the total content of Y and the rare earth element(s) is in the above range, there occurs deposition of a sufficient amount of intermetallic compound on a grain boundary. It is thus possible to limit grain growth, obtain improvement in material strength and achieve higher welding strength between the ground electrode and the metal shell.

Preferably, the electrode material contains an intermetallic compound of Ni and at least one of Y and the rare earth elements on at least the grain boundary. There is a case where crystal grains of the electrode material become coarse i.e. grow due to secondary recrystallization in a severe environment that causes load as in the occurrence of spark discharge under high-temperature conditions. However, the growth of the crystal grains can be limited so as to maintain the grain size of the crystal grains at a small size and keep the complicated grain boundary of the electrode material when the intermetallic compound exists on at least the grain boundary. Further, the electrode material can be sufficiently protected from internal oxidation by preventing oxygen etc. from entering deeply through the grain boundary from the outside when the oxide of Y and the rare earth element(s) is formed on the grain boundary in the electrode material. It is thus possible to attain both of high oxidation resistance and spark wear resistance in the existence of the intermetallic compound on at least the grain boundary in the electrode material.

The intermetallic compound is a stable compound that does not undergo decomposition etc. even under the high-temperature conditions to which the spark plug electrodes are subjected. The above effects can be obtained by either the intermetallic compound containing Ni and Y, the intermetallic compound containing Ni and the rare earth element(s) or the intermetallic compound containing Ni and Y and the rare earth element(s). The intermetallic compound may optionally contain another component as long as it contains Ni and Y and/or the rare earth element.

For improvements in the oxidation resistance and spark wear resistance of the ground electrode, it suffices that the intermetallic compound is deposited and exists on at least the grain boundary of the electrode material. The intermetallic compound may exist only on the grain boundary and may exist on the grain boundary and inside the grains. The existence of the intermetallic compound can be confirmed by electron probe micro analysis (EPMA) of the diffusion state (concentration distribution) of the respective elements such as Ni, Y and rare earth element on the surface or cross section of the ground electrode.

The electrode material substantially contains Ni, at least one selected from the group consisting of Y and rare earth elements, Mn, at least one selected from the group consisting of Ti, V and Nb and optionally Si, Al, Cr and/or C. The contents of these material components are controlled to within the above respective ranges provided that the sum of the contents of the material components and the content of the unavoidable impurity(s) is 100 mass %. For example, S, P, Fe, Cu, B, Zr, Mg and/or Ca may be contained in a trace amount as the unavoidable impurity(s). Although it is preferable to minimize the content of the unavoidable impurity, the unavoidable impurity(s) can be contained in such an amount that achieves the object of the present invention. Preferably, the content of one kind of unavoidable impurity is 0.1 part by mass or less; and the total content of the unavoidable impurities is 0.2 part by mass per 100 parts by mass of the sum of the material components.

The content of each component in the electrode material can be determined by the following procedure. In the case where the simple-structured ground electrode or the outer layer of the layer-structured ground electrode is formed from the above electrode material, a measurement sample is taken from any part other then the fused joint between the ground electrode and the metal shell and/or the other member e.g. noble metal tip or between the outer layer and the metal shell, the inner layer and/or the other member e.g. noble metal tip. The content of C in the electrode material is determined by carbon/sulfur analysis. The content of any component other than C in the electrode material is determined by ICP emission spectrometry (inductively coupled plasma emission spectrometry). (It is preferable to take 0.3 g or more of sample for the carbon/sulfur analysis and 0.2 g or more of sample for the ICP emission spectrometry.) The content of Ni in the electrode material is determined as a remainder excluding the above measurement values. The carbon/sulfur analysis is performed by thermally decomposing the sample in a combustion furnace and detecting nondispersive infrared radiation (with the use of e.g. a carbon/sulfur analysis apparatus EMIA-920A manufactured by Horiba Ltd.). The ICP emission spectrometry is performed by forming a solution of the sample by an acid decomposition method (e.g. nitric acid decomposition method), analyzing the sample solution qualitatively, and then, quantifying the measurement element and the designated element (with the use of e.g. a ICP emission spectroscope iCAP-6500 manufactured by Thermo Fisher K.K.). In either analysis process, the content of each component in the electrode material is determined by calculating an average of three measurement values.

It is feasible to prepare the electrode material by mixing raw materials at given mixing ratios. The composition of the prepared electrode material is substantially equal to the composition of the raw materials. The contents of the respective components in the electrode material can be thus simply determined based on the mixing ratios of the raw materials.

For example, the electrode material can be prepared in such a manner that the contents of the respective material components fall within the above respective ranges by melting 96 mass % or more of Ni, 0.05 to 0.45 mass % in total of at least one selected from the group consisting of Y and rare earth elements, 0.05 to 3 mass % of Mn, 0.01 to 0.1 mass % in total of at least one selected from the group consisting of Ti, V and Nb and optionally 0.15 to 1.5 mass % of Si, 0.01 to 0.1 mass % of Al, 0.05 to 0.5 mass % of Cr and 0.005 mass % or more of C. At this time, the ratio (a/b) of the total content (a) of Ti, V and Nb to the content (b) of Mn is adjusted to 0.02 to 0.4.

The thus-prepared electrode material is formed into a predetermined shape and adopted as the center electrode 2 and/or the ground electrode 6.

As shown in FIGS. 1(*a*), 1(*b*) and 2, the spark plug 1 is manufactured by resistance welding the base end of the ground electrode 6 to the end face 41 of the end portion of the metal shell 4 with the application of load in the axis direction of the metal shell 4 (i.e. in the direction in agreement with the axis 1*c* of the spark plug 1). Namely, the ground electrode 6 and the metal shell 4 are resistance welded together in the state that the end face of the base end of the ground electrode 6 is held in contact with and pressed against the end face 41 of the metal shell 4 in the axis direction of the metal shell 4.

Figure 3:
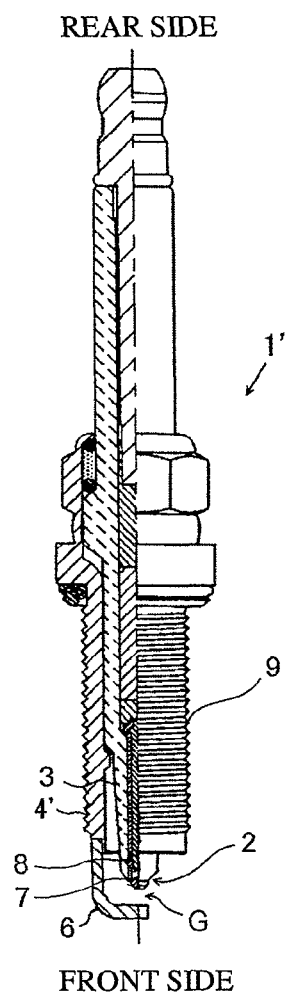
FIG. 3 is a schematic view, partly in section, of the spark plug according to another embodiment of the present invention.

FIGS. 3 and 4 schematically show a spark plug 1' as another embodiment of the present invention. In this spark plug 1', a cut 44 is formed in a circumferential side surface of an end portion of a metal shell 4'; and a base end portion of a ground electrode 6 is joined by electric resistance welding into the cut 44 as shown in FIGS. 3 and 4.

The cut 44 is open at the circumferential side surface of the end portion of the metal shell 4' and at an end face of the metal shell 4' such that the ground electrode 6 can be inserted in the cut 44.

More specifically, the spark plug 1' includes a substantially rod-shaped center electrode 2, a substantially cylindrical insulator 3 disposed around an outer circumference of the center electrode 2, a cylindrical metal shell 4' retaining therein the insulator 3 and a ground electrode 6 having a distal end facing a front end face of the center electrode 2 with a spark discharge gap G left therebetween and a base end joined to an end portion of the metal shell 4'. It is herein noted that, for the sake of convenience, one end side of the spark plug 1' on which the ground electrode 6 is arranged in the metal shell 4' (e.g. the bottom side in FIG. 3) is referred to as a front side and the other end side of the spark plug 1' (e.g. the top side in FIG. 3) is referred to as a rear side.

As clearly shown in FIG. 4, a cut 44 is formed in an elongated slit shape in an outer circumferential surface of the end portion of the metal shell 4' along an axis direction of the metal shell 4' in the spark plug 1'. This cut 44 is recessed such that the ground electrode 6 is inserted in the cut 44 for the electric resistance welding of the ground electrode 6 to the metal shell 4'. Herein, the cut 44 is slightly smaller in dimension than the ground electrode 6. There is no particular limitation on the dimension and shape of the cut 44 as long as the ground electrode 6 can be inserted in the cut 44 and fixed in welding position. In the present embodiment, the cross section and dimension of the cut 44 are uniform at any position in a direction perpendicular to the axis direction of the metal shell 4'.

The insulator 3 and center electrode 2 of the spark plug 1' are basically the same as those of the spark plug 1. The ground electrode 6 of the spark plug 1' is basically the same as that of the spark plug 1, except that the ground electrode 6 is axially elongated by a length that allows insertion in the cut 44.

In the spark plug 1', the base end of the ground electrode 6 is inserted in and joined by electric resistance welding to the cut 44 of the metal shell 4' with the application of load in a radial direction D of the metal shell 4' toward an axis 1'*c* of the spark plug 1'.

As shown in FIG. 4, a high hardness region 45 is formed in the end portion of the metal shell 4' to which the ground electrode 6 has been joined by resistance welding. This high hardness region 45 has its hardness increased due to solid phase transformation of the material of the metal shell 4' under the action of heat generated by the flow of a large electric current through the ground electrode 6 and the metal shell 4' during the electric resistance welding as in the case of the high hardness region of the spark plug 1. Thus, the high hardness region 45 of the spark plug 1' is basically the same as the high hardness region 42 of the spark plug 1.

As the ground electrode 6 is joined to the cut 44 of the metal shell 4' by electric resistance welding with the application of load in the radial direction D of the metal shell 4' as mentioned above, the high hardness region 45 is formed so as to extend in the direction of diffusion of heat generated during the electric resistance welding, e.g., in the radial direction of the metal shell 4' toward the axis 1'*c* of the spark plug 1' as shown in FIG. 4.

The high hardness region 45 is thus defined as a region surrounded by a welding interface between the ground electrode 6 and the metal shell 4', i.e., a welding boundary 62 on the side of the ground electrode 6 and by an interface between the high hardness region 45 and the region where the hardness remains unchanged by electric resistance welding, i.e., a welding boundary 46 on the side of the metal shell 4'. In FIG. 4, the high hardness region 45 is defined by the welding boundary 62 on the side of the ground electrode 6 and the welding boundary 46 on the side of the metal shell 4' when viewed in cross section along a plane including the axis 1'c of the spark plug 1' and the axis 6c of the ground electrode 6. The welding boundary 62 on the side of the ground electrode 6 and the welding boundary 46 on the side of the metal shell 4' are basically the same as the welding boundary 61 on the side of the ground electrode 6 and the welding boundary 43 on the side of the metal shell 4 in the spark plug 1.

The high hardness region 45, when viewed in cross section along the plane including the axis 1'c of the spark plug 1' and the axis 6c of the ground electrode 6 as shown in FIG. 4, has a length d of 0.3 to 0.8 mm from the welding boundary 62 on the side of the ground electrode 6 to the welding boundary 46 on the side of the metal shell 4' in the direction D of load applied during the electric resistance welding. In other words, the high hardness region 45 extends in the end portion of the metal shell 4' over a length d of 0.3 to 0.8 mm from the welding boundary 62 on the side of the ground electrode 6 to the welding boundary 46 on the side of the metal shell 4' in the load direction D of the electric resistance welding when viewed in cross section along the plane including the axis 1'c of the spark plug 1' and the axis 6c of the ground electrode 6. If the length d is less than 0.3 mm, the ground electrode 6 may not be joined by electric resistance welding to the metal shell 4'. If the length d exceeds 0.8 mm, the ground electrode 6 can be joined by electric resistance welding to the metal shell 4' but with low welding strength. In order to achieve higher welding strength between the ground electrode 6 and the metal shell 4', the length d of the high hardness region is preferably 0.35 to 0.65 mm, more preferably 0.4 to 0.6 mm, still more preferably 0.45 to 0.55 mm. Herein, the length d refers to a maximum length of the high hardness region in the direction D of load applied during the electric resistance welding. In the spark plug 1', the length d is a length of the high hardness region in the direction D of load applied during the electric resistance welding as measured at a middle point in the cut 44 in the direction of the axis 6c.

The length d can be measured basically in the same manner as that of the spark plug 1, i.e., by cutting the spark plug 1' along the plane including the axis 1'c of the spark plug 1' and the axis 6c of the ground electrode 6, observing the cross section of the spark plug 1' with a metallurgical microscope, determining the direction D of load applied during the electric resistance welding and the welding boundaries 62 and 46 in the cross-sectional microscopic photograph and determining the maximum length from the welding boundary 62 to the welding boundary 46 in the load direction D as the length d in the cross-sectional microscopic photograph as in the case of the spark plug 1.

One manufacturing method of the spark plug according to the present invention will be explained below. First, the ground electrode can be produced as follows.

An alloy material is prepared from raw materials for production of the ground electrode of the spark plug according to the present invention. The thus-prepared alloy material is subjected to casting and annealing and formed into a wire or rod of predetermined shape and dimensions as the ground electrode 6.

It is feasible to produce the ground electrode 6 continuously from the alloy material by, e.g., preparing a molten alloy of the above composition in a vacuum melting furnace, vacuum casting the molten alloy into an ingot and forming the ingot into a rod of predetermined shape and dimensions by hot working, drawing etc. When the alloy material is subjected to casting and annealing in a vacuum, the intermetallic compound can be formed on at least the grain boundary in the ground electrode.

The ground electrode 6" in which the inner layer 64 is located in the outer layer 63 can be produced as follows. The alloy material is subjected to casting and drawn into a rod shape. The rod-shaped material is then formed into a cup shape as the material of the outer layer. Any material having a higher thermal conductivity than the alloy material of the outer electrode, such as Cu or Cu alloy, is formed into a rod shape by casing, hot working and drawing as the material of the inner layer. The rod-shaped material of the inner layer is inserted into the cup-shaped material of the outer layer. The ground electrode 6" in which the inner layer is located in the outer layer is obtained by subjecting the above combined material to plastic working such as extrusion and drawing. The thus-produced ground electrode is subjected to annealing by heating at 600 to 980° C. for 1 hour in an inert atmosphere as the hardness of the ground electrode has been increased by the above working process.

The thus-produced ground electrode 6, 6" can be bent into a substantially L-shape and then joined to the metal shell by electric resistance welding. Alternatively, the above-produced rod-shaped ground electrode material may be bent so as to face the front end face of the center electrode 2 via the spark discharge gap G after being joined to the metal shell by electric resistance welding.

The electrode material of the ground electrode 6, 6" preferably has a specific resistance of 7 to 20 μΩ·cm at room temperature for use in the spark plug according to the present invention. If the specific resistance of the electrode material is too low, the electric resistance welding is difficult to perform so that the welding strength between the ground electrode and the metal shell may be lowered. If the specific resistance of the electrode material is too high, the high hardness region becomes so large that the welding strength between the ground electrode and the metal shell may be lowered. When the specific resistance of the electrode material is relatively low but falls within the above range, the high hardness region can formed over the above length d by electric resistance welding of the ground electrode and the metal shell. It is thus possible to join the ground electrode and the metal shell securely by electric resistance welding. The specific resistance of the ground electrode is preferably 8 to 17 μΩ·cm, more preferably 9 to 11 μΩ·cm, at room temperature.

Further, the electrode material preferably has a specific resistance of 48 to 60 μΩ·cm at 1000° C. It is possible to join the ground electrode and the metal shell securely by electric resistance welding when the specific resistance of the electrode material is relatively low but falls within the above range as in the case of the room-temperature specific resistance of the electrode material. The specific resistance of the ground electrode is preferably 49 to 54 μΩ·cm, more preferably 50 to 52 μΩ·cm, at 1000° C.

It is particularly preferable that the specific resistance of the electrode material at room temperature and the specific resistance of the electrode material at 1000° C. are both within the above respective ranges. The specific resistance of the electrode material at room temperature and at 1000° C. can be measured by the above-mentioned method.

Then, the base end portion of the ground electrode is joined by electric resistance welding to the end portion of the metal shell, which has been formed into a predetermined shape by plastic working. The electric resistance welding of the ground electrode to the end portion of the metal shell is conducted with the application of load in the predetermined direction.

It is feasible in the spark plug 1 of FIG. 1 to conduct the electric resistance welding by bringing the base end of the ground electrode 6 into contact with the end face 41 of the metal shell 4 as shown in FIG. 2 with the application of load in the axis direction of the metal shell 4, while bringing a metal support member into contact with the rear end portion of the metal shell 4 and pushing an electrode of an electric resistance welding machine against the ground electrode 6.

It is feasible in the spark plug 1' of FIG. 4 to conduct the electric resistance welding by inserting the base portion of the ground electrode 6 in the cut 44 and bring the circumferential side surface of the base portion of the ground electrode 6 into contact with the bottom of the cut 44 as shown in FIG. 4 with the application of load in the radial direction of the metal shell 4' toward the axis direction D of the metal shell 4'. In this case, the cut 44 is made by cutting with the use of e.g. a milling machine, to be slightly smaller in dimension than the base end portion of the ground electrode 6. As the end portion of the metal shell 4' may be deformed with the application of load onto the ground electrode 6 in the direction D, the electric resistance welding is preferably conducted by inserting an electrically grounded metal support member through the metal shell 4' and pushing an electrode of an electric resistance welding machine against the ground electrode 6.

For example, the metal shell 4 and the ground electrode 6 can be resistance welded in the state of pressing the end portion of the ground electrode 6 against the end portion of the metal shell 4.

By the electrical resistance welding of the metal shell 4 and the ground electrode 6 with the application of load, it is possible to limit the formation of the high hardness region on the metal shell 4 such that the length d falls within the above range and thus possible to join the ground electrode 6 to the metal shell 4 with high welding strength even in the case where the ground electrode 6 is of the alloy material having the above specific resistance and being relatively difficult to resistance weld.

The electric current supplied to the ground electrode and the metal shell is preferably 0.8 to 3.0 kA per unit contact area; and the time of supply of the electric current to the ground electrode and the metal shell is preferably 6 to 50 cycles (1 cycle=1/60 second). Even in the case where the ground electrode is of the alloy material having the above specific resistance and being relatively difficult to resistance weld, it is possible to resistance weld the ground electrode to the metal shell with higher welding strength when either of the current value and the current supply time is in the above range.

After the joining of the ground electrode to the metal shell, the center electrode is produced by forming the above-mentioned inner member into a cylindrical shape, forming the above-mentioned outer member into a cup shape, inserting the inner member in the outer member, and then, subjecting the resulting electrode material to plastic working such as extrusion; and the insulator is produced by sintering a ceramic material etc. into a predetermined shape.

The center electrode is fixed in the insulator by a known method. The thus-obtained insulator unit is assembled into the subassembly of the metal shell and the ground electrode. In this way, the spark plug is manufactured.

In the spark plug according to the present invention, the ground electrode can be joined by electric resistance welding to the metal shell securely with high welding strength even when the ground electrode is of the relatively difficult-to-resistance-weld alloy material. Namely, the spark plug according to the present invention can be manufactured with high productivity.

The spark plug according to the present invention is not limited to the above-mentioned embodiments. Various changes and modifications are possible within a range that can achieve the object of the present invention. In the spark plug 1, 1', 1", the front end face of the center electrode 2 and the surface of the distal end of the ground electrode 6, 6" face each other via the spark discharge gap G in the axis direction of the center electrode 2. Alternatively, the circumferential side surface of the center electrode and the end face of the distal end of the ground electrode may face each other via the spark discharge gap in the radial direction of the center electrode in the present invention. In this case, it is feasible to provide a single ground electrode or a plurality of ground electrodes so as to face the circumferential side surface of the center electrode.

The center electrode 2 and the ground electrode 6, 6" are provided in the spark plug 1, 1', 1" as shown in FIGS. 1, 3 and 5. In the present invention, a noble metal tip may be disposed on the front end portion of the center electrode and/or the surface of the ground electrode.

Further, the cut 44 is formed in the metal shell 4' in the spark plug 1' as shown in FIGS. 3 and 4. The cut 44 is not limited to the above form as long as it is in recessed form or chamfered form so as to bring the ground electrode into contact with the metal shell from the circumferential side surface of the metal shell. The cut 44 may be formed as a chamfered portion by cutting out the outer circumferential surface of the metal shell.

EXAMPLES

Example 1

Samples of a ground electrode without an inner layer were produced, in the above-mentioned manner, from electrode material containing 98.505 mass % of Ni, 0.10 mass % of Y, 0.14 mass % of Mn and 0.02 mass % Ti and having a Ti/Mn content ratio (a/b) of 0.14 such that each sample had a length of 16 mm, a width of 2.8 mm and a thickness of 1.5 mm. It was confirmed and identified by electron probe micro analysis that an intermetallic compound containing Ni and Y and an intermetallic compound containing Ni and rare earth element existed on a grain boundary in the produced ground electrode.

On the other hand, samples of a ground electrode with inner and outer layers were produced in the above-mentioned manner such that each sample had a length of 16 mm, a width of 2.8 mm and a thickness of 1.5 mm. Herein, the composition of the outer layer was the same as that of the ground electrode without the inner layer; and the inner layer was of Cu. It was confirmed and identified by electron probe micro analysis that, in the ground electrode with the inner layer, an intermetallic compound containing Ni and Y and an intermetallic compound containing Ni and rare earth element existed on a grain boundary of the outer layer. In the ground electrode with the inner layer, a core of pure Ni may be arranged inside the inner layer. In the following experiment, the ground electrode in which the core was arranged inside the inner layer had the same results as the ground electrode with the inner layer.

Further, samples of the metal shell 4 were produced from low-carbon steel by plastic working such that each sample had a predetermined shape and dimensions. The end face of the ground electrode without the inner layer was brought into contact with the end face 41 of the metal shell 4 with the application of load in the axis direction of the metal shell 4 (i.e. in the direction parallel with the axis 6c) by supporting the rear end portion of the metal shell 4 with a support member made of Cu. The ground electrode without the inner layer was joined by electric resistance welding to the metal shell 4 while maintaining the above state and pushing an electrode of an electric resistance welding machine against the ground electrode. At this time, the electric current supplied to the ground electrode without the inner layer was 2.0 kA; and the current supply time was 10 cycles (1 cycle=1/60 second). The ground electrode with the inner layer was joined by electric resistance welding to the metal shell 4 in the same manner as above.

Next, the cylindrical inner member 8 and the cup-shaped outer member 7 were formed from copper and Ni alloy, respectively, as shown in FIG. 1. Samples of the center electrode 2 were each produced by inserting the inner member 8 in the outer member 7 and subjecting the resulting electrode material to plastic working such as extrusion such that the resulting center electrode 2 with the inner and outer members 8 and 7 had a diameter of 2.5 mm.

Subsequently, samples of the insulators 3 were produced by sintering alumina-based ceramic material into a predetermined shape. The center electrode 2 was fixed in the insulator 3. The insulator 3 was then assembled into the subassembly of the metal shell 4 and the ground electrode with or without the inner layer. By the above process, a plurality of samples of the spark plugs shown in FIGS. 1 and 5 were manufactured.

In the meantime, the integral unit in which the ground electrode had been resistance welded to the end portion of the metal shell was taken out from the manufacturing process of the spark plug. The integral unit was cut along a plane including the axis of the metal shell and the axis of the ground electrode. Vickers hardness measurements were carried out at the cross section of the integral unit so as to confirm the presence of a high hardness region and specify a boundary at which the Vickers hardness became lower than $3 \times 10^2$ Hv or higher than $5 \times 10^2$ Hv as a metal shell-side welding boundary. Further, the cross section of the integral unit was etched and observed with a metallurgical microscope. In the thus-obtained cross-sectional microscopic photograph, a ground electrode-side welding boundary was specified in the above-mentioned manner. A length from the ground electrode-side welding boundary to the metal shell-side welding boundary in the direction D of load applied during the electric resistance welding (i.e. in the direction parallel with the axis) was measured. The maximum measurement value of this length was determined as length d. The length d indicates the range of the high hardness region.

The welding strength at the high hardness region was evaluated in terms of tensile strength. The tensile strength was measured by means of a tensile strength testing machine "Autograph AG-5000B (trade name)" manufactured by Shimadzu Corporation.

The tensile strength measurement results are indicated by symbols in TABLE 1. In TABLE 1, the symbols are defined as follows with respect to the ground electrode without the inner layer. With respect to the ground electrode with the inner layer, the symbols are defined in view of the temperature reducing effect of the inner layer in such a manner that the threshold values of the tensile strength are 100 N/mm² lower than those of the corresponding symbols of the ground electrode without the inner layer.

○○○: The tensile strength was higher than or equal to 550 N/mm². The welding strength was evaluated as very high.

○○: The tensile strength was higher than or equal to 450 N/mm² and was lower than 550 N/mm². The welding strength was evaluated as high.

○: The tensile strength was higher than or equal to 350 N/mm² and was lower than 450 N/mm². The welding strength was evaluated as being a practically required level.

X: The tensile strength was lower than 350 N/mm². The welding strength was evaluated as not being at a practically required level.

-: The ground electrode and the metal shell 4 could not be joined by electric resistance welding.

TABLE 1

| | Hardness at welding joint | High hardness region d (mm) | | | | | | | | | |
|---|---|---|---|---|---|---|---|---|---|---|---|
| | | 0.1 | 0.2 | 0.3 | 0.4 | 0.5 | 0.6 | 0.7 | 0.8 | 0.9 | 1 |
| Ground electrode without inner layer | 300 to 500 Hv | — | — | ○ | ○○ | ○○○ | ○○ | ○ | ○ | x | x |
| Ground electrode with inner layer | 300 to 500 Hv | — | — | ○ | ○○ | ○○○ | ○○ | ○ | ○ | x | x |

As is apparent from TABLE 1, there would be no problem in practical use when the high hardness region was formed with a Vickers hardness of 300 to 500 Hv in such a manner that the length d of the high hardness region was in a range of 0.3 to 0.8 mm.

Example 2

Samples of a ground electrode without an inner layer were produced in such a manner that the ground electrode had the same composition as that of Example 1 and showed a specific resistance at room temperature (25° C.) as shown in TABLE 2. The ground electrode was resistance welded to the end face of the metal shell in the same manner as in Example 1, thereby forming an integral unit of the ground electrode and the metal shell where the welding joint had a high hardness region formed with a Vickers hardness of 300 to 500 Hv. Similarly, samples of a ground electrode with inner and outer layers were produced in such a manner that the outer layer of the ground electrode had the same composition as that of Example 1 and showed a specific resistance at room temperature (25° C.) as shown in TABLE 2, and then, the ground electrode and the metal shell were resistance welded together into an integral unit.

The relationship between the length d of the high hardness region and the welding strength is indicated in TABLE 2. The definitions of the symbols in TABLE 2 are the same as those in Example 1.

TABLE 2

| Specific resistance of ground electrode (μΩ·cm) | Ground electrode without inner layer | | Ground electrode with inner layer | |
|---|---|---|---|---|
| | Length d of high hardness region | Welding strength | Length d of high hardness region | Welding strength |
| 7 | less than 0.3 mm | — | less than 0.3 mm | — |
| | 0.3 to 0.8 mm | ◯ | 0.3 to 0.8 mm | ◯ |
| | more than 0.8 mm | X | more than 0.8 mm | X |
| 8 | less than 0.3 mm | — | less than 0.3 mm | — |
| | 0.3 to 0.8 mm | ◯◯ | 0.3 to 0.8 mm | ◯◯ |
| | more than 0.8 mm | X | more than 0.8 mm | X |
| 9 | less than 0.3 mm | — | less than 0.3 mm | — |
| | 0.3 to 0.8 mm | ◯◯◯ | 0.3 to 0.8 mm | ◯◯◯ |
| | more than 0.8 mm | X | more than 0.8 mm | X |
| 10 | less than 0.3 mm | — | less than 0.3 mm | — |
| | 0.3 to 0.8 mm | ◯◯◯ | 0.3 to 0.8 mm | ◯◯◯ |
| | more than 0.8 mm | X | more than 0.8 mm | X |
| 11 | less than 0.3 mm | — | less than 0.3 mm | — |
| | 0.3 to 0.8 mm | ◯◯◯ | 0.3 to 0.8 mm | ◯◯◯ |
| | more than 0.8 mm | X | more than 0.8 mm | X |
| 12 | less than 0.3 mm | — | less than 0.3 mm | — |
| | 0.3 to 0.8 mm | ◯◯ | 0.3 to 0.8 mm | ◯◯ |
| | more than 0.8 mm | X | more than 0.8 mm | X |
| 13 | less than 0.3 mm | — | less than 0.3 mm | — |
| | 0.3 to 0.8 mm | ◯◯ | 0.3 to 0.8 mm | ◯◯ |
| | more than 0.8 mm | X | more than 0.8 mm | X |
| 14 | less than 0.3 mm | — | less than 0.3 mm | — |
| | 0.3 to 0.8 mm | ◯◯ | 0.3 to 0.8 mm | ◯◯ |
| | more than 0.8 mm | X | more than 0.8 mm | X |
| 15 | less than 0.3 mm | — | less than 0.3 mm | — |
| | 0.3 to 0.8 mm | ◯◯ | 0.3 to 0.8 mm | ◯◯ |
| | more than 0.8 mm | X | more than 0.8 mm | X |
| 16 | less than 0.3 mm | — | less than 0.3 mm | — |
| | 0.3 to 0.8 mm | ◯◯ | 0.3 to 0.8 mm | ◯◯ |
| | more than 0.8 mm | X | more than 0.8 mm | X |
| 17 | less than 0.3 mm | — | less than 0.3 mm | — |
| | 0.3 to 0.8 mm | ◯◯ | 0.3 to 0.8 mm | ◯◯ |
| | more than 0.8 mm | X | more than 0.8 mm | X |
| 18 | less than 0.3 mm | — | less than 0.3 mm | — |
| | 0.3 to 0.8 mm | ◯ | 0.3 to 0.8 mm | ◯ |
| | more than 0.8 mm | X | more than 0.8 mm | X |
| 19 | less than 0.3 mm | — | less than 0.3 mm | — |
| | 0.3 to 0.8 mm | ◯ | 0.3 to 0.8 mm | ◯ |
| | more than 0.8 mm | X | more than 0.8 mm | X |
| 20 | less than 0.3 mm | — | less than 0.3 mm | — |
| | 0.3 to 0.8 mm | ◯ | 0.3 to 0.8 mm | ◯ |
| | more than 0.8 mm | X | more than 0.8 mm | X |

As is apparent from TABLE 2, it was possible to attain high welding strength when the ground electrode without the inner layer where the specific resistance of the ground electrode was in a range of 7 to 20 μΩ·cm at room temperature or the ground electrode with the inner and outer layers where the specific resistance of the outer layer was in a range of 7 to 20 μΩ·cm at room temperature was resistance welded to the end face of the metal shell in such a manner that the high hardness region was formed with a Vickers hardness of 300 to 500 Hv over a length d of 0.3 to 0.8 mm on the weld joint.

Example 3

Samples of a ground electrode without an inner layer were produced in such a manner that the ground electrode had the same composition as that of Example 1 and showed a specific resistance at 1000° C. as shown in TABLE 3. The ground electrode was resistance welded to the end face of the metal shell in the same manner as in Example 1, thereby forming an integral unit of the ground electrode and the metal shell where the welding joint had a high hardness region formed with a Vickers hardness of 300 to 500 Hv. Similarly, samples of a ground electrode with inner and outer layers were produced in such a manner that the outer layer of the ground electrode had the same composition as that of Example 1 and showed a specific resistance at 1000° C. as shown in TABLE 3, and then, the ground electrode and the metal shell were resistance welded together into an integral unit.

The relationship between the length d of the high hardness region and the welding strength is indicated in TABLE 3. The definitions of the symbols in TABLE 3 are the same as those in Example 1.

TABLE 3

| Specific resistance of ground electrode (μΩ·cm) | Ground electrode without inner layer | | Ground electrode with inner layer | |
|---|---|---|---|---|
| | Length d of high hardness region | Welding strength | Length d of high hardness region | Welding strength |
| 48 | less than 0.3 mm | — | less than 0.3 mm | — |
|    | 0.3 to 0.8 mm | ○ | 0.3 to 0.8 mm | ○ |
|    | more than 0.8 mm | X | more than 0.8 mm | X |
| 49 | less than 0.3 mm | — | less than 0.3 mm | — |
|    | 0.3 to 0.8 mm | ○○ | 0.3 to 0.8 mm | ○○ |
|    | more than 0.8 mm | X | more than 0.8 mm | X |
| 50 | less than 0.3 mm | — | less than 0.3 mm | — |
|    | 0.3 to 0.8 mm | ○○○ | 0.3 to 0.8 mm | ○○○ |
|    | more than 0.8 mm | X | more than 0.8 mm | X |
| 51 | less than 0.3 mm | — | less than 0.3 mm | — |
|    | 0.3 to 0.8 mm | ○○○ | 0.3 to 0.8 mm | ○○○ |
|    | more than 0.8 mm | X | more than 0.8 mm | X |
| 52 | less than 0.3 mm | — | less than 0.3 mm | — |
|    | 0.3 to 0.8 mm | ○○○ | 0.3 to 0.8 mm | ○○○ |
|    | more than 0.8 mm | X | more than 0.8 mm | X |
| 53 | less than 0.3 mm | — | less than 0.3 mm | — |
|    | 0.3 to 0.8 mm | ○○ | 0.3 to 0.8 mm | ○○ |
|    | more than 0.8 mm | X | more than 0.8 mm | X |
| 54 | less than 0.3 mm | — | less than 0.3 mm | — |
|    | 0.3 to 0.8 mm | ○○ | 0.3 to 0.8 mm | ○○ |
|    | more than 0.8 mm | X | more than 0.8 mm | X |
| 55 | less than 0.3 mm | — | less than 0.3 mm | — |
|    | 0.3 to 0.8 mm | ○ | 0.3 to 0.8 mm | ○ |
|    | more than 0.8 mm | X | more than 0.8 mm | X |
| 57 | less than 0.3 mm | — | less than 0.3 mm | — |
|    | 0.3 to 0.8 mm | ○ | 0.3 to 0.8 mm | ○ |
|    | more than 0.8 mm | X | more than 0.8 mm | X |
| 58 | less than 0.3 mm | — | less than 0.3 mm | — |
|    | 0.3 to 0.8 mm | ○ | 0.3 to 0.8 mm | ○ |
|    | more than 0.8 mm | X | more than 0.8 mm | X |
| 59 | less than 0.3 mm | — | less than 0.3 mm | — |
|    | 0.3 to 0.8 mm | ○ | 0.3 to 0.8 mm | ○ |
|    | more than 0.8 mm | X | more than 0.8 mm | X |
| 60 | less than 0.3 mm | — | less than 0.3 mm | — |
|    | 0.3 to 0.8 mm | ○ | 0.3 to 0.8 mm | ○ |
|    | more than 0.8 mm | X | more than 0.8 mm | X |

As is apparent from TABLE 3, it was possible to attain high welding strength when the ground electrode without the inner layer where the specific resistance of the ground electrode was in a range of 48 to 60 μΩ·cm at 1000° C. or the ground electrode with the inner and outer layers where the specific resistance of the outer layer was in a range of 48 to 60 μΩ·cm at 1000° C. was resistance welded to the end face of the metal shell in such a manner that the high hardness region was formed with a Vickers hardness of 300 to 500 Hv over a length d of 0.3 to 0.8 mm on the weld joint.

Further, the presence of the high hardness region in the resistance weld joint of the integral unit of the metal shell and the ground electrode without the inner layer was confirmed in the same manner as in Example 1. The tensile strength of the high hardness region of the weld joint was measured in the same manner as in Example 1. Furthermore, the presence of a martensite structure in the weld joint was confirmed by etching a cross section of the weld joint and observing the etched cross section with a metallurgical microscope. The relationship between the presence or absence of the martensite structure and the tensile strength reflecting the welding strength in the high hardness region is indicated in TABLE 4.

TABLE 4

| | High hardness region d (mm) | | | | | | | | | |
|---|---|---|---|---|---|---|---|---|---|---|
| | 0.1 | 0.2 | 0.3 | 0.4 | 0.5 | 0.6 | 0.7 | 0.8 | 0.9 | 1 |
| Hardness at welding joint | — | — | ○ | ○○ | ○○○ | ○○ | ○ | ○ | x | x |
| Martensite structure | absent | absent | present | present | present | present | present | present | present | present |

The symbols referring to the welding strength and the definitions of the symbols in TABLE 4 are the same as those in Example 1. In TABLE 4, the term "present" means that the presence of the martensite structure was confirmed; and the term "absent" means that the presence of the martensite structure was not confirmed.

As is apparent from TABLE 4, the integral unit of the metal shell and the ground electrode had high welding strength when the high hardness region in which the martensite structure was present extends within the range of 0.3 to 0.8 mm. If the length d of the high hardness region exceeded 0.8 mm, the welding strength was lowered even in the presence of the martensite structure in the high hardness region. If the length d of the high hardness region was less than 0.3 mm, it was impossible to join the ground electrode to the metal shell by electric resistance welding and was impossible to confirm the presence of the martensite structure in the high hardness region. The ground electrode with the inner layer had the same evaluation results as the ground electrode without the inner layer.

Examples 4 to 18

Using electrode materials having respective compositions shown in TABLE 5, samples of a ground electrode without an inner layer and a ground electrode with an inner layer were produced in the same manner as in Example 1 such that each sample had a length of 16 mm, a width of 2.8 mm and a thickness of 1.5 mm. Samples of the spark plug according to the present invention were manufactured in the same manner as in Example 1 using the above-produced ground electrode samples. The welding strength at the high hardness region of the metal shell of the spark plug was evaluated in terms of tensile strength in the same manner as in Example 1. The evaluation results are indicated in TABLE 5.

duced from the electrode material containing 96 mass % or more of Ni, 0.05 to 0.45 mass % of Y, 0.05 mass % or more of Mn and 0.01 mass % or more of Ti and having a Ti/Mn content ratio (a/b) of 0.02 to 0.40.

DESCRIPTION OF REFERENCE NUMERALS 1, 1', 1": Spark plug
2: Center electrode
4: Metal shell
41: End face
42, 45: High hardness region
43, 46: Welding boundary
44: Cut
6, 6": Ground electrode
61, 62: Welding boundary
63: Outer layer
64: Inner layer

The invention claimed is:

1. A spark plug, comprising:
a cylindrical metal shell;
a ground electrode joined by electric resistance welding to an end portion of the metal shell,
wherein the metal shell has a high hardness region formed with a Vickers hardness of $3 \times 10^2$ to $5 \times 10^2$ Hv in the end portion thereof in such a manner that the high hardness region, when viewed in cross section along a plane including an axis of the spark plug and an axis of the ground electrode, has a length d of 0.3 to 0.8 mm from a ground electrode-side welding boundary to a metal shell-side welding boundary in a direction of load applied during the electric resistance welding.

TABLE 5

| Example | Composition (mass %) | | | | | | | | | | Ground electrode without inner layer | | Ground electrode with inner layer | |
|---|---|---|---|---|---|---|---|---|---|---|---|---|---|---|
| | Ni | Si | Cr | Mn | Al | Ti | Y | C | Total | Ti/Mn | Welding strength | d | Welding strength | d |
| 4 | 97.705 | 1.1 | 0.1 | 1 | 0.03 | 0.06 | — | 0.005 | 100.000 | 0.06 | ○○ | 0.6 | ○○ | 0.6 |
| 5 | 97.655 | 1.1 | 0.1 | 1 | 0.03 | 0.06 | 0.05 | 0.005 | 100.000 | 0.06 | ○○○ | 0.5 | ○○○ | 0.5 |
| 6 | 97.255 | 1.1 | 0.1 | 1 | 0.03 | 0.06 | 0.45 | 0.005 | 100.000 | 0.06 | ○○○ | 0.5 | ○○○ | 0.5 |
| 7 | 97.105 | 1.1 | 0.1 | 1 | 0.03 | 0.06 | 0.6 | 0.005 | 100.000 | 0.06 | ○○ | 0.6 | ○○ | 0.6 |
| 8 | 98.565 | 1.1 | 0.1 | 0.1 | 0.03 | — | 0.1 | 0.005 | 100.000 | — | ○○ | 0.4 | ○○ | 0.4 |
| 9 | 98.635 | 1.1 | 0.1 | 0.01 | 0.03 | 0.02 | 0.1 | 0.005 | 100.000 | 2.00 | ○○ | 0.4 | ○○ | 0.4 |
| 10 | 98.615 | 1.1 | 0.1 | 0.03 | 0.03 | 0.02 | 0.1 | 0.005 | 100.000 | 0.67 | ○○ | 0.4 | ○○ | 0.4 |
| 11 | 98.605 | 1.1 | 0.1 | 0.04 | 0.03 | 0.02 | 0.1 | 0.005 | 100.000 | 0.50 | ○○ | 0.4 | ○○ | 0.4 |
| 12 | 98.601 | 1.1 | 0.1 | 0.044 | 0.03 | 0.02 | 0.1 | 0.005 | 100.000 | 0.45 | ○○ | 0.4 | ○○ | 0.4 |
| 13 | 98.595 | 1.1 | 0.1 | 0.05 | 0.03 | 0.02 | 0.1 | 0.005 | 100.000 | 0.40 | ○○○ | 0.5 | ○○○ | 0.5 |
| 14 | 98.575 | 1.1 | 0.1 | 0.07 | 0.03 | 0.02 | 0.1 | 0.005 | 100.000 | 0.29 | ○○○ | 0.5 | ○○○ | 0.5 |
| 15 | 98.505 | 1.1 | 0.1 | 0.14 | 0.03 | 0.02 | 0.1 | 0.005 | 100.000 | 0.14 | ○○○ | 0.5 | ○○○ | 0.5 |
| 16 | 97.605 | 1.1 | 0.1 | 1 | 0.03 | 0.06 | 0.1 | 0.005 | 100.000 | 0.06 | ○○○ | 0.5 | ○○○ | 0.5 |
| 17 | 96.105 | 1.1 | 0.1 | 2.5 | 0.03 | 0.06 | 0.1 | 0.005 | 100.000 | 0.02 | ○○○ | 0.5 | ○○○ | 0.5 |
| 18 | 96.645 | 1.1 | 0.1 | 2 | 0.03 | 0.02 | 0.1 | 0.005 | 100.000 | 0.01 | ○○ | 0.6 | ○○ | 0.6 |

As is apparent from TABLE 5, the welding strength of the spark plug was evaluated as "○○" or "○○○" when the high hardness region was formed with a Vickers hardness of $3 \times 10^2$ to $5 \times 10^2$ Hv on the end portion of the metal shell in such a manner that, when viewed in cross section along the plane including the axis of the spark plug and the axis of the ground electrode, the high hardness region has a length d of 0.3 to 0.8 mm from the ground electrode-side welding boundary to the metal shell-side welding boundary in the direction of load applied during the electric resistance welding.

In particular, the welding strength of the spark plug was evaluated as "○○○" when the ground electrode was pro- 2. The spark plug according to claim 1, wherein the length d is in a range of 0.4 to 0.6 mm.

3. The spark plug according to claim 1, wherein the high hardness region contains at least an acicular martensite structure.

4. The spark plug according to claim 1, wherein the ground electrode has either a simple structure formed of one kind of electrode material or a layer structure including an outer layer formed of the electrode material and an inner layer arranged in the outer layer and having a higher thermal conductivity than the outer layer.

5. The spark plug according to claim 4, wherein the electrode material has a specific resistance of 7 to 20 μΩ·cm at room temperature.

6. The spark plug according to claim 4, wherein the electrode material has a specific resistance of 48 to 60 μΩ·cm at 1000° C.

7. The spark plug according to claim 4, wherein the electrode material contains 96 mass % or more of Ni, 0.05 to 0.45 mass % in total of at least one selected from the group consisting of Y and rare earth elements, 0.05 mass % or more of Mn and 0.01 mass % or more in total of at least one selected from the group consisting of Ti, V and Nb; and wherein the ratio (a/b) of the total content (a) of said Ti, V and Nb to the content (b) of said Mn ranges from 0.02 to 0.40.

8. The spark plug according to claim 7, wherein the electrode material contains an intermetallic compound of Ni and at least one of Y and rare earth elements.

9. The spark plug according to claim 5, wherein the electrode material has a specific resistance of 48 to 60 μΩ·cm at 1000° C.

10. The spark plug according to claim 4, wherein the length d is in a range of 0.4 to 0.6 mm.

11. The spark plug according to claim 4, wherein the high hardness region contains at least an acicular martensite structure.

* * * * *